United States Patent
Seo et al.

(10) Patent No.: US 12,484,625 B2
(45) Date of Patent: Dec. 2, 2025

(54) AEROSOL GENERATION DEVICE HAVING DIFFERENTIATED HEATING FUNCTION AND AEROSOL-GENERATING ARTICLE APPLIED THERETO

(71) Applicant: KT&G CORPORATION, Daejeon (KR)

(72) Inventors: Jang Won Seo, Daejeon (KR); Chul Ho Jang, Daejeon (KR); Gyoung Min Go, Daejeon (KR); Hyung Jin Bae, Daejeon (KR); Min Seok Jeong, Daejeon (KR); Jong Seong Jeong, Daejeon (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 129 days.

(21) Appl. No.: 18/042,135

(22) PCT Filed: Mar. 25, 2022

(86) PCT No.: PCT/KR2022/004205
§ 371 (c)(1),
(2) Date: Feb. 17, 2023

(87) PCT Pub. No.: WO2022/220438
PCT Pub. Date: Oct. 20, 2022

(65) Prior Publication Data
US 2024/0008546 A1    Jan. 11, 2024

(30) Foreign Application Priority Data
Apr. 16, 2021 (KR) .................. 10-2021-0049703

(51) Int. Cl.
*A24F 40/465* (2020.01)
*A24D 1/20* (2020.01)
(Continued)

(52) U.S. Cl.
CPC .............. *A24F 40/465* (2020.01); *A24D 1/20* (2020.01); *A24F 40/20* (2020.01); *H05B 6/105* (2013.01); *H05B 6/44* (2013.01)

(58) Field of Classification Search
None
See application file for complete search history.

(56) References Cited

U.S. PATENT DOCUMENTS

2016/0022930 A1\* 1/2016 Greim ..................... A24F 40/30
                                                                131/328
2016/0143355 A1    5/2016 Borges et al.
(Continued)

FOREIGN PATENT DOCUMENTS

KR    10-2015-0139977 A    12/2015
KR    10-2019-0097277 A    8/2019
(Continued)

OTHER PUBLICATIONS

Korean Office Action dated May 24, 2023 in Korean Application No. 10-2021-0049703.
(Continued)

*Primary Examiner* — Cynthia Szewczyk
(74) *Attorney, Agent, or Firm* — Sughrue Mion, PLLC

(57) ABSTRACT

An aerosol generation device having a differentiated heating function and an aerosol-generating article applied thereto are provided. The aerosol generation device according to some embodiments of the present disclosure may include a housing configured to form an accommodation space for accommodating an aerosol-generating article and a heater part configured to heat the aerosol-generating article accommodated in the accommodation space to generate an aerosol. Here, by including a first heating part configured to heat a first part of the aerosol-generating article from a first distance and a second heating part configured to heat a second part of the aerosol-generating article from a second distance longer than the first distance, the heater part can heat each part of the aerosol-generating article in a differentiated manner.

11 Claims, 14 Drawing Sheets

(51) Int. Cl.
*A24F 40/20* (2020.01)
*H05B 6/10* (2006.01)
*H05B 6/44* (2006.01)

(56) References Cited

U.S. PATENT DOCUMENTS

| | | | |
|---|---|---|---|
| 2019/0191780 A1* | 6/2019 | Wilke | A24D 1/20 |
| 2019/0364973 A1* | 12/2019 | Kaufman | A24F 40/465 |
| 2020/0383379 A1 | 12/2020 | Yilmaz | |
| 2021/0219617 A1 | 7/2021 | Lee et al. | |

FOREIGN PATENT DOCUMENTS

| | | |
|---|---|---|
| KR | 10-2020-0069112 A | 6/2020 |
| KR | 10-2020-014409 A | 12/2020 |
| KR | 10-2021-0010448 A | 1/2021 |
| KR | 10-2022-0053858 A | 5/2022 |
| WO | 2019/219867 A1 | 11/2019 |
| WO | 2020/221643 A1 | 11/2020 |
| WO | 2020/260322 A1 | 12/2020 |

OTHER PUBLICATIONS

International Search Report of PCT/KR2022/004205 dated Jun. 30, 2022 [PCT/ISA/210].
Korean Office Action of KR10-2021-0049703 dated Nov. 8, 2022.

* cited by examiner

AEROSOL GENERATION DEVICE HAVING DIFFERENTIATED HEATING FUNCTION AND AEROSOL-GENERATING ARTICLE APPLIED THERETO

CROSS REFERENCE TO RELATED APPLICATIONS

This application is a National Stage of International Application No. PCT/KR2022/004205 filed on Mar. 25, 2022, claiming priority based on Korean Patent Application No. 10-2021-0049703 filed on Apr. 16, 2021.

TECHNICAL FIELD

The present disclosure relates to an aerosol generation device having a differentiated heating function and an aerosol-generating article applied thereto, and more particularly, to an aerosol generation device, which is capable of heating each part of an aerosol-generating article in a differentiated manner to provide an improved smoking quality, and an aerosol-generating article that is applicable to the device.

BACKGROUND ART

In recent years, demand for alternative articles that overcome the disadvantages of traditional cigarettes has increased. For example, demand for devices that electrically heat a cigarette to generate an aerosol (e.g., cigarette-type electronic cigarettes) has increased, and accordingly, active research has been carried out on electric heating-type aerosol generation devices.

Meanwhile, one important factor that influences a user's smoking quality is a heating temperature of an aerosol generation device. This is because when the heating temperature is too low, a tobacco smoke taste may be weak, and when the heating temperature is too high, the tobacco smoke taste may be overexpressed at the beginning of smoking and disappear quickly before the end of smoking. Therefore, in order to provide an improved smoking quality to the user, there is a need to appropriately control the heating temperature of the aerosol generation device.

Also, in a case in which each part of a cigarette includes a material with a different expression temperature, heating each part in a differentiated manner may have a positive effect on improving the smoking quality. This is because when each part of the cigarette is heated at the same temperature, a material included in a certain part of the cigarette may be underexpressed or overexpressed.

DISCLOSURE

Technical Problem

Some embodiments of the present disclosure are directed to providing an aerosol generation device having a differentiated heating function.

Some embodiments of the present disclosure are also directed to providing an aerosol-generating article that is applicable to an aerosol generation device having a differentiated heating function.

Objectives of the present disclosure are not limited to the above-mentioned objectives, and other unmentioned objectives should be clearly understood by those of ordinary skill in the art to which the present disclosure pertains from the description below.

Technical Solution

Some embodiments of the present disclosure provide an aerosol generation device including a housing configured to form an accommodation space for accommodating an aerosol-generating article and a heater part configured to heat the aerosol-generating article accommodated in the accommodation space to generate an aerosol. Here the heater part may include a first heating part configured to heat a first part of the aerosol-generating article from a first distance and a second heating part configured to heat a second part of the aerosol-generating article from a second distance longer than the first distance.

In some embodiments, the heater part may further include an inductor configured to inductively heat the first heating part and the second heating part.

In some embodiments, the first part may be a first segment of the aerosol-generating article, the second part may be a second segment disposed downstream of the first segment, the first segment may include an aerosol-forming agent, and the second segment may include a nicotine-generating substrate.

In some embodiments, an inner diameter of the first heating part may be less than an inner diameter of the second heating part.

In some embodiments, the heater part may further include an inductor, and the inductor may include a first coil part for inductively heating the first heating part and a second coil part for inductively heating the second heating part. Here, a diameter of the first coil part may be less than a diameter of the second coil part.

In some embodiments, a heat capacity difference between the first heating part and the second heating part may be 10% or less of a heat capacity of the first heating part.

Advantageous Effects

According to some embodiments of the present disclosure, an aerosol generation device having a differentiated heating function can be provided. The provided aerosol generation device can heat a first part and a second part of an aerosol-generating article in a differentiated manner to improve smoking quality. For example, in a case in which an aerosol-generating article accommodated in the device includes a first segment containing an aerosol-forming agent and a second segment containing a nicotine-generating substrate, the provided aerosol generation device may heat the first segment, in which a material expression temperature is higher, more strongly than the second segment. In this case, as an aerosol is easily formed in the first segment and an appropriate amount of nicotine is continuously expressed from the second segment, a lasting tobacco smoke taste and abundant vapor production can be provided to a user. That is, a high-quality smoking experience can be provided to the user.

The advantageous effects according to the technical spirit of the present disclosure are not limited to those mentioned above, and other unmentioned advantageous effects should be clearly understood by those of ordinary skill in the art from the description below.

[Modes of the Invention]

Figure 1:
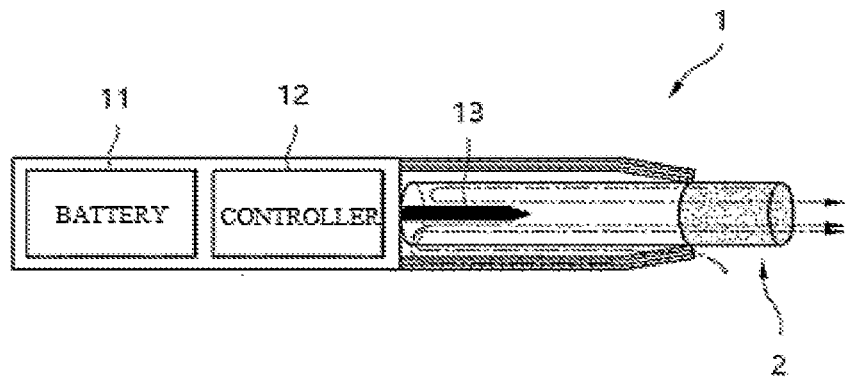
FIG. 1 is an exemplary view schematically illustrating an aerosol generation device according to some embodiments of the present disclosure.

Hereinafter, exemplary embodiments of the present disclosure will be described in detail with reference to the accompanying drawings. Advantages and features of the present disclosure and methods of achieving the same should become clear from embodiments described in detail below with reference to the accompanying drawings. However, the technical spirit of the present disclosure is not limited to the following embodiments and may be implemented in various different forms. The following embodiments only make the technical spirit of the present disclosure complete and are provided to completely inform those of ordinary skill in the art to which the present disclosure pertains of the scope of the disclosure. The technical spirit of the present disclosure is defined only by the scope of the claims.

In assigning reference numerals to components of each drawing, it should be noted that the same reference numerals are assigned to the same components where possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used in this specification have the same meaning as commonly understood by those of ordinary skill in the art to which the present disclosure pertains. Terms defined in commonly used dictionaries should not be construed in an idealized or overly formal sense unless expressly so defined herein. Terms used in this specification are for describing the embodiments and are not intended to limit the present disclosure. In this specification, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the possibility of presence or addition of one or more components, steps, operations, and/or devices other than those mentioned.

Prior to description of various embodiments of the present disclosure, some terms used in the following embodiments will be clarified.

In the following embodiments, "aerosol-forming agent" may refer to a material that can facilitate aerosol formation. Examples of the aerosol-forming agent may include glycerin, propylene glycol, ethylene glycol, dipropylene glycol, diethylene glycol, triethylene glycol, tetraethylene glycol, and oleyl alcohol, but the aerosol-forming agent is not limited thereto. The term "aerosol-forming agent" may be interchangeably used with the term "moisturizer" or "wetting agent" in the art.

In the following embodiments, "aerosol-forming substrate" may refer to a material that is able to form an aerosol. The aerosol may include a volatile compound. The aerosol-forming substrate may be a solid or liquid.

For example, solid aerosol-forming substrates may include solid materials based on tobacco raw materials such as reconstituted tobacco leaves, shredded tobacco, and reconstituted tobacco, and liquid aerosol-forming substrates may include liquid compositions based on nicotine, tobacco extracts, and/or various flavoring agents. However, the scope of the present disclosure is not limited to the above-listed examples. The aerosol-forming substrate may further include an aerosol-forming agent in order to stably form an aerosol.

In the following embodiments, "aerosol generation device" may refer to a device that generates an aerosol using an aerosol-forming substrate in order to generate an aerosol that can be inhaled directly into the user's lungs through the user's mouth. Some examples of the aerosol generation device will be described below with reference to FIGS. 1 to 3.

In the following embodiments, "aerosol-generating article" may refer to an article that is able to generate an aerosol. The aerosol-generating article may include an aerosol-forming substrate. A typical example of the aerosol-generating article may include a cigarette, but the scope of the present disclosure is not limited thereto.

In the following embodiments, "upstream" or "upstream direction" may refer to a direction moving away from an oral region of a user (smoker), and "downstream" or "downstream direction" may refer to a direction approaching the oral region of the user. The terms "upstream" and "downstream" may be used to describe relative positions of components constituting an aerosol-generating article. For example, in an aerosol-generating article 2 illustrated in FIG. 4, an aerosol-forming substrate part 21 is disposed upstream or in an upstream direction of a filter part 22, and the filter part 22 is disposed downstream or in a downstream direction of the aerosol-forming substrate part 21.

In the following embodiments, "puff" refers to inhalation by a user, and the inhalation may be a situation in which a user draws smoke into his or her oral cavity, nasal cavity, or lungs through the mouth or nose.

In the following embodiments, "longitudinal direction" may refer to a direction corresponding to a longitudinal axis of an aerosol-generating article.

Hereinafter, various embodiments of the present disclosure will be described in detail with reference to the accompanying drawings.

FIG. 1 is an exemplary view schematically illustrating an aerosol generation device 1 according to some embodiments of the present disclosure. In particular, FIG. 1 and so on illustrate an example in which an aerosol-generating article 2 is accommodated (inserted) in the device 1.

As illustrated in FIG. 1, the aerosol generation device 1 may include a housing, a heater part 13, a battery 11, and a controller 12. However, only the components relating to the embodiment of the present disclosure are illustrated in FIG. 1. Therefore, those of ordinary skill in the art to which the present disclosure pertains should understand that the aerosol generation device 1 may further include general-purpose components other than the components illustrated in FIG. 1. For example, the aerosol generation device 1 may further include an input module (e.g., a button, a touchable display, etc.) for receiving a command or the like from a user and an output module (e.g., a light emitting module (LED), a display, a vibration motor, etc.) configured to output information such as a state of the device or smoking information of the device. Hereinafter, each component of the aerosol generation device 1 will be described.

The housing may form an exterior of the aerosol generation device 1. Also, the housing may form an accommodation space for accommodating the aerosol-generating article 2. The housing may be implemented using a material that can protect components therein.

Next, the heater part 13 may heat the aerosol-generating article 2 accommodated in the accommodation space. Specifically, when the aerosol-generating article 2 is accommodated in the accommodation space of the aerosol generation device 1, the heater part 13 may heat the aerosol-generating article 2 using power supplied from the battery 11. The aerosol-generating article 2 may generate an aerosol when heated, and the generated aerosol may be inhaled through the oral region of the user.

An operation method and/or an implementation form of the heater part 13 may vary.

For example, the heater part 13 may operate using a resistive heating method. For example, the heater part 13 may include an electrically insulating substrate (e.g., a substrate formed of polyimide) and an electrically conductive track and may include an electrically-resistive heating element configured to generate heat as current flows in the electrically conductive track.

As another example, the heater part 13 may operate using an induction heating method. For example, the heater part 13 may include an induction coil and a heating element (that is, a susceptor) inductively heated by the induction coil. The susceptor may be disposed outside the aerosol-generating article 2 or inside the aerosol-generating article 2.

However, the scope of the present disclosure is not limited to the above examples, and the heater part 13 may operate using any other method as long as the heater part 130 can heat the aerosol-generating article 2 to a desired temperature. Here, the desired temperature may be preset in the aerosol generation device 1 (e.g., a temperature profile may be pre-stored therein) or may be set by the user.

Also, for example, the heater part 13 may be implemented in a form that includes a heating element configured to heat the aerosol-generating article 2 from the inside (hereinafter referred to as "internal heating element"), a heating element configured to heat the aerosol-generating article 2 from the outside (hereinafter referred to as "external heating element"), or a combination thereof. For example, the internal heating element may be tubular, needle-shaped, rod-shaped, or the like and disposed to pass through at least a portion of the aerosol-generating article 2, and the external heating element may be plate-shaped, cylindrical, or the like and disposed to surround at least a portion of the aerosol-generating article 2. However, the scope of the present disclosure is not limited thereto, and the shapes of the heating elements, the number of heating elements, the arrangement form of the heating elements, and the like may be designed in various ways.

Meanwhile, in various embodiments of the present disclosure, the heater part 13 may be configured to heat each part of the aerosol-generating article 2 in a differentiated manner. For example, in a case in which expression temperatures (or optimum heating temperatures) of materials included in a first part and a second part of the aerosol-generating article 2 are different, the heater part 13 may heat the first part and the second part in a differentiated manner according to the material expression temperatures. In that way, a high-quality smoking experience can be provided to a user. Here, the material expression temperature may be a temperature at which the corresponding material can be continuously well-expressed during smoking. In order to avoid repeated description, a differentiated heating structure and a principle of the heater part 13 will be described in detail below with reference to FIG. 5 and so on. Also, one example of the aerosol-generating article 2 that is suitable for differentiated heating will be described below with reference to FIG. 4.

Next, the battery 11 may supply power used to operate the aerosol generation device 1. For example, the battery 11 may supply power to allow the heater part 13 to heat the aerosol-generating article 2 and may also supply power necessary to operate the controller 12.

Also, the battery 11 may supply power necessary to operate electric components such as a display (not illustrated), a sensor (not illustrated), and a motor (not illustrated) that are installed in the aerosol generation device 1.

Next, the controller 12 may control the overall operation of the aerosol generation device 1. For example, the controller 12 may control the operation of the heater part 13 and the battery 11 and may also control the operation of other components included in the aerosol generation device 1. The controller 12 may control the power supplied by the battery 11, a heating temperature of the heater part 13, and the like. Also, the controller 12 may check a state of each of the components of the aerosol generation device 1 and determine whether the aerosol generation device 1 is in an operable state.

The controller 12 may be implemented with at least one controller (processor). The controller may also be implemented with an array of a plurality of logic gates or implemented with a combination of a general-purpose microcontroller and a memory which stores a program that may be executed by the microcontroller. Also, those of ordinary skill in the art to which the present disclosure pertains should understand that the controller 12 may also be implemented with other forms of hardware.

The aerosol-generating article 2 may have a structure similar to that of a general combustion-type cigarette. For example, the aerosol-generating article 2 may be divided into an aerosol-forming substrate part which includes an aerosol-forming substrate (e.g., an aerosol-forming agent, a nicotine-generating substrate, etc.) and a filter part which includes a filter material. At least a portion of the aerosol-forming substrate part may be inserted into the aerosol generation device 1, and the filter part may be exposed to the outside, but the present disclosure is not limited thereto. The user may smoke while holding the filter part in his or her mouth.

In some embodiments, the aerosol-forming substrate part of the aerosol-generating article 2 may include a plurality of segments. Also, each segment may include a material with a different expression temperature. For example, a first segment may include an aerosol-forming agent that has a relatively high material expression temperature, and a second segment may include a nicotine-generating substrate that has a relatively low material expression temperature. The aerosol-generating article 2 may heat each segment in a differentiated manner to provide a high-quality smoking experience. This will be described in detail below with reference to FIG. 4.

Hereinafter, other types of aerosol generation devices 1 will be described with reference to FIGS. 2 and 3. However, for clarity of the present disclosure, description of content overlapping with the previous embodiment will be omitted.

Figure 2:
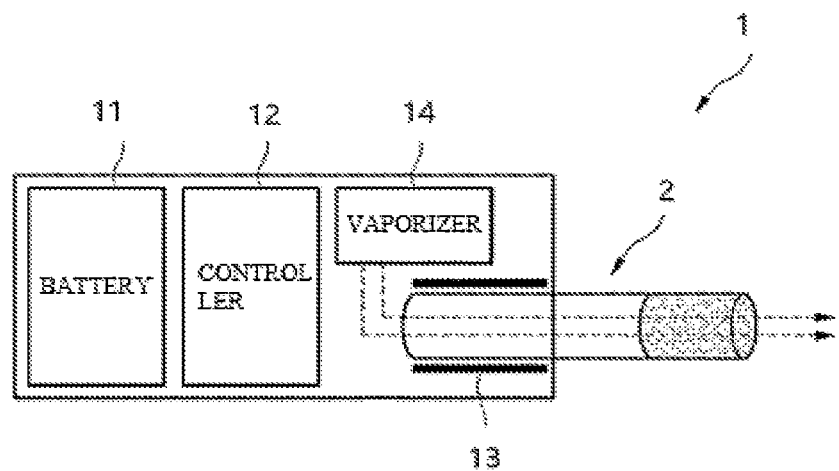
FIGS. 2 and 3 are exemplary views schematically illustrating aerosol generation devices according to some other embodiments of the present disclosure.
Figure 3:
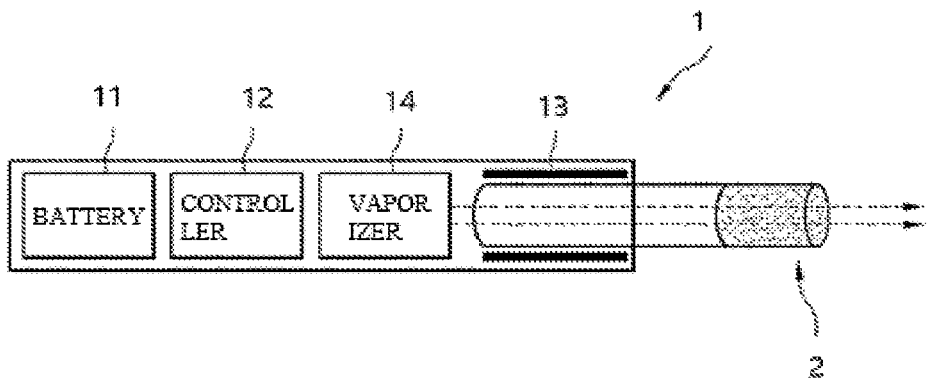

FIGS. 2 and 3 are views for describing aerosol generation devices 1 according to some other embodiments of the present disclosure.

As illustrated in FIGS. 2 and 3, the aerosol generation device 1 according to the present embodiment may further include a vaporizer 14. FIG. 2 illustrates a case in which the heater part 13 (or the aerosol-generating article 2) and the vaporizer 14 are disposed in parallel, and FIG. 3 illustrates a case in which the heater part 13 (or the aerosol-generating article 2) and the vaporizer 14 are disposed in series. However, an internal structure of the aerosol generation device 1 is not limited to the examples of FIGS. 2 and 3, and the arrangement of the components may be changed in any way.

In FIGS. 2 and 3, the vaporizer 14 may include a liquid reservoir configured to store a liquid aerosol-forming substrate, a wick configured to absorb the aerosol-forming substrate, and a vaporizing element configured to vaporize the absorbed aerosol-forming substrate to generate an aerosol. However, the scope of the present disclosure is not limited thereto, and the vaporizer 14 may be designed to have a structure that does not include a wick.

The vaporizing element may be implemented in various forms such as a heating element and a vibration element and may be controlled by the controller 12. For example, in a case in which the vaporizing element is implemented as a heating element, the operation, heating temperature, and the like of the heating element may be controlled by the controller 12.

The aerosol generated in the vaporizer 14 may pass through the aerosol-generating article 2 and be inhaled through the oral region of the user. In other words, the aerosol formed by the vaporizer 14 may move along an airflow path of the aerosol generation device 1, and the airflow path may be configured to allow the formed aerosol to pass through the aerosol-generating article 2 and be delivered to the user.

For reference, the term "vaporizer" may be interchangeably used with the term "cartomizer," "atomizer," or "cartridge" in the art.

The aerosol generation devices 1 according to various embodiments of the present disclosure have been schematically described above with reference to FIGS. 1 to 3. Hereinafter, the aerosol-generating article 2 according to some embodiments of the present disclosure will be described with reference to FIG. 4.

Figure 4:
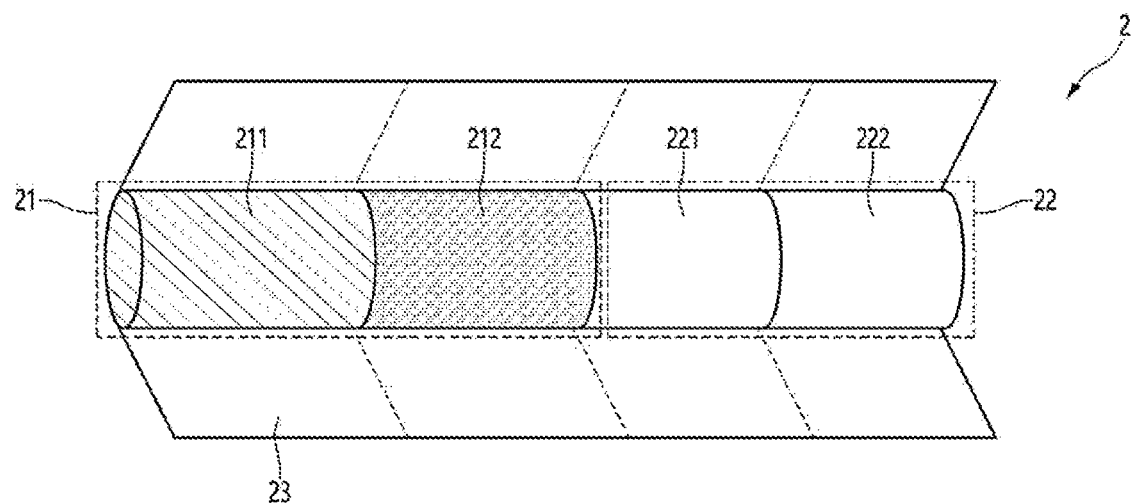
FIG. 4 is an exemplary view illustrating an aerosol-generating article according to some embodiments of the present disclosure.

FIG. 4 is an exemplary view illustrating the aerosol-generating article 2 according to some embodiments of the present disclosure.

As illustrated in FIG. 4, the aerosol-generating article 2 may include the aerosol-forming substrate part 21, the filter part 22, and a wrapper 23. However, FIG. 4 only illustrates an exemplary embodiment of the present disclosure, and the structure of the aerosol-generating article 2 may be changed from that illustrated in FIG. 4. Also, each of the aerosol-forming substrate part 21 and the filter part 22 may include the wrapper 23.

As illustrated, the aerosol-forming substrate part 21 may include a plurality of segments 211 and 212. FIG. 4 illustrates an example in which the number of segments of the aerosol-forming substrate part 21 is two, but the number of segments may be three or more.

Each of the segments 211 and 212 may include a material with a different expression temperature (or optimum heating temperature). For example, a first segment 211 may include an aerosol-forming agent (e.g., which has an expression temperature of about 290° C.), and a second segment 212 disposed downstream of the first segment 211 may include a nicotine-generating substrate (e.g., which has an expression temperature of about 150° C.). In this case, a high-temperature aerosol formed in the first segment 211 may, while passing through the second segment 212, transfer the nicotine component to provide a high-quality smoking experience to the user. However, to ensure the high-quality smoking experience, each of the segments 211 and 212 should be heated in a differentiated manner corresponding to the material expression temperatures. This is because, when the first segment 211 is heated according to the material expression temperature of the second segment 212 (e.g., about 150° C.), an aerosol is not formed well, and conversely, when the second segment 212 is heated according to the material expression temperature of the first segment 211 (e.g., about 290° C.), a tobacco smoke taste may be over-expressed at the beginning of smoking (that is, most of the nicotine component may be transferred at the beginning of smoking) and disappear towards the end of smoking.

As a more specific example, the first segment 211 may include crimped paper impregnated with an aerosol-forming agent. For example, the aerosol-forming agent may include at least one of glycerin, propylene glycol, ethylene glycol, dipropylene glycol, diethylene glycol, triethylene glycol, tetraethylene glycol, and oleyl alcohol. However, the aerosol-forming agent is not limited thereto.

Also, for example, the nicotine-generating substrate may include shredded tobacco, tobacco particles, tobacco sheets, tobacco beads, and tobacco granules. Alternatively, the nicotine-generating substrate may include crimped paper impregnated with tobacco extracts. When the nicotine-generating substrate is heated, nicotine may be generated (expressed) from the nicotine-generating substrate and transferred to the filter part 22.

Next, the filter part 22 may perform a function of filtering the aerosol formed in the aerosol-forming substrate part 21. The filter part 22 may be formed of a single segment or formed of a plurality of segments (e.g., 221, 222). For example, the filter part 22 may consist of a first filter segment 221 and a second filter segment 222 as illustrated or may consist of three or more segments.

The first filter segment 221 may perform a function of cooling the aerosol. Therefore, the first filter segment 221 may be referred to as "cooling segment 221."

The cooling segment 221 may be implemented in various forms. For example, the cooling segment 221 may be a cylindrical paper tube, which is made of paper and includes a hollow, or a cellulose acetate tube filter. As another example, the cooling segment 221 may be made of a polymer material or a biodegradable polymer material. The polymer material may be, for example, a woven material produced using polylactic acid (PLA) fibers but is not limited thereto. As still another example, the cooling segment 221 may be produced as a cellulose acetate filter having a plurality of holes formed therein. However, the scope of the present disclosure is not limited to the above examples, and the cooling segment 221 may be implemented in any other way as long as the cooling segment 221 can perform an aerosol cooling function.

Next, the second filter segment 222 may perform a function of filtering the cooled aerosol. To this end, the second filter segment 222 may include a filter material such as cellulose acetate fibers or paper. Also, the second filter segment 222 may serve as a mouthpiece that comes into contact with the user's oral region. Therefore, the second filter segment 222 may be referred to as "mouthpiece segment 222."

The mouthpiece segment 222 may be implemented in various forms. For example, the mouthpiece segment 222 may be a cellulose acetate filter. However, the mouthpiece segment 222 is not limited thereto. Also, for example, the mouthpiece segment 222 may be a cylindrical rod or a tubular rod which includes a hollow formed therein. Also, the mouthpiece segment 222 may be a recessed rod.

Also, the mouthpiece segment 222 may include at least one capsule (not illustrated). Here, the capsule (not illustrated) may perform a function of producing a flavor or perform a function of generating an aerosol. For example, the capsule (not illustrated) may have a structure in which a liquid including a flavoring is wrapped by a film. The capsule (not illustrated) may have a spherical or cylindrical shape, but the shape of the capsule (not illustrated) is not limited thereto.

Next, the wrapper 23 may wrap around at least a portion of the aerosol-generating article 2. For example, the wrapper 23 may include a first wrapper which wraps around the aerosol-forming substrate part 21 and a second wrapper which wraps around the filter part 22. Also, the wrapper 23 may further include a third wrapper which wraps around the aerosol-forming substrate part 21 and the filter part 22 together. The third wrapper may generally serve as tip paper. At least one of the first to third wrappers may be biodegradable wrapping paper. When biodegradable wrapping paper is used, the aerosol-generating article 2 can be rapidly degraded by microorganisms, and thus environmental pollution can be reduced.

The aerosol-generating article 2 according to some embodiments of the present disclosure has been described above with reference to FIG. 4. Hereinafter, various embodiments of the heater part 13 that can provide a high-quality smoking experience by heating the above-described aerosol-generating article 2 in a differentiated manner will be described. Also, hereinafter, in order to provide convenience of understanding, description will be continued assuming that the heater part 13 includes two heating parts which operate using the induction heating method and assuming that the aerosol-generating article 2 is configured to have the structure illustrated in FIG. 4 and the first segment 211 includes an aerosol-forming agent and the second segment 212 includes a nicotine-generating substrate. However, the scope of the present disclosure is not limited thereto.

First, the heater part 13 according to a first embodiment of the present disclosure will be described with reference to FIGS. 5 to 9.

Figure 5:
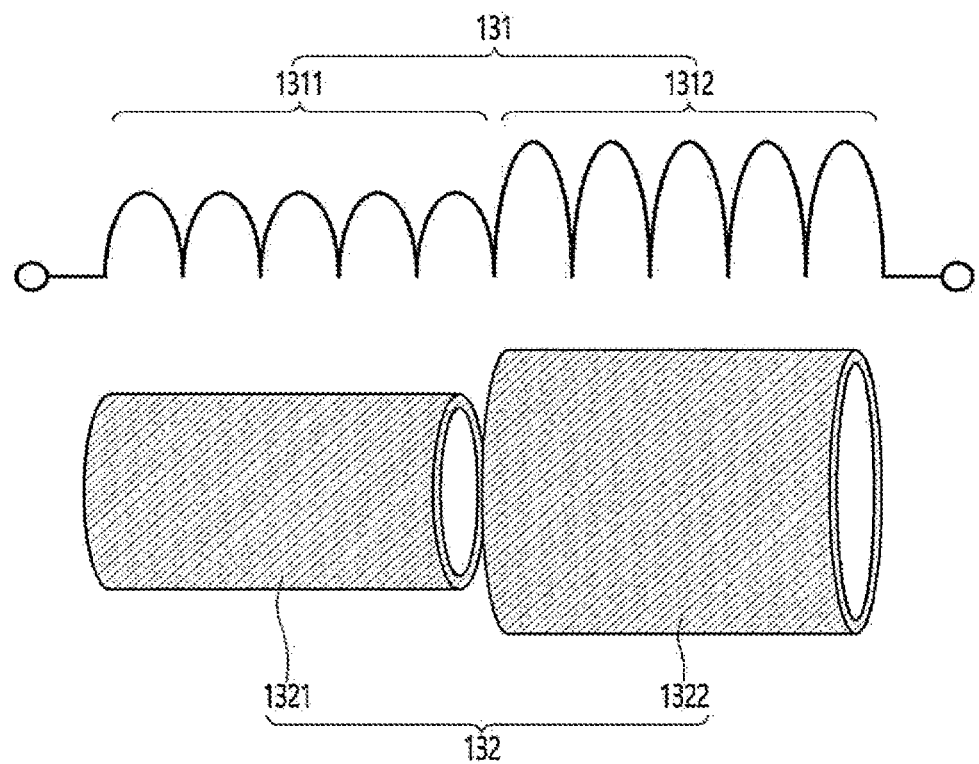
FIGS. 5 and 6 are exemplary views for describing a differentiated heating structure and a principle of a heater part according to a first embodiment of the present disclosure.
Figure 6:
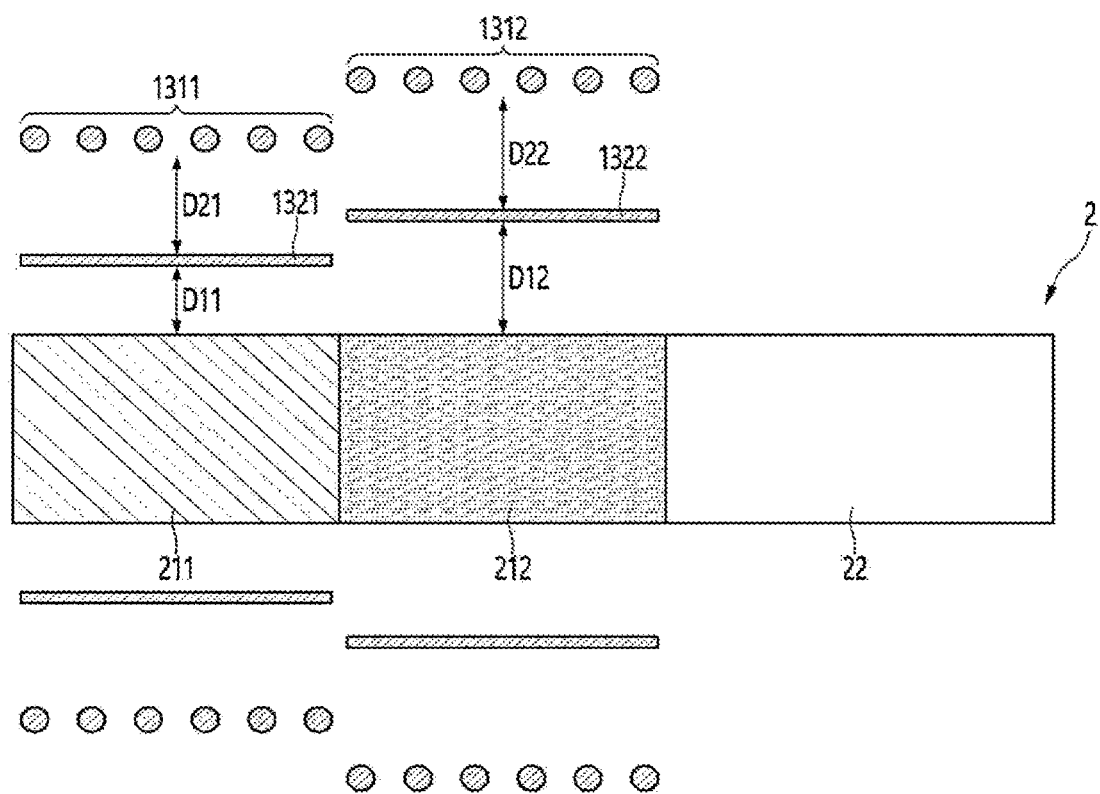

FIGS. 5 and 6 are exemplary views for describing a differentiated heating structure and a principle of the heater part 13 according to the first embodiment of the present disclosure. In particular, in FIG. 6 and so on, a state in which the aerosol-generating article 2 is accommodated (inserted) in the device 1 is illustrated, and, for convenience, the filter part 22 is illustrated as a single segment.

As illustrated in FIGS. 5 and 6, the present embodiment relates to the heater part 13 that heats the aerosol-generating article 2 in a differentiated manner on the basis of a distance between a heating element 132 and the aerosol-generating article 2.

Specifically, the heater part 13 according to the present embodiment may include an inductor 131 and the heating element 132. However, only the components relating to the embodiment of the present disclosure are illustrated in FIG. 5. Therefore, those of ordinary skill in the art to which the present disclosure pertains should understand that the heater part 13 may further include general-purpose components other than the components illustrated in FIG. 5. Hereinafter, each component of the heater part 13 will be described.

The inductor 131 may perform a function of inductively heating the heating element 132. The inductor 131 may include one or more coil parts 1311 and 1312. For example, the inductor 131 may include a first coil part 1311 for inductively heating a first heating part 1321, which constitutes the heating element 132, and a second coil part 1312 for inductively heating a second heating part 1322. Of course, in some cases, the inductor 131 may further include a third coil part (not illustrated) for inductively heating a third heating part (not illustrated).

In some embodiments, the first coil part 1311 and the second coil part 1312 may be independently controlled by the controller 12. For example, the first coil part 1311 and the second coil part 1312 may be configured as separate coils, and an intensity, a frequency, or the like of alternating current (power) supplied to the first coil part 1311 and the second coil part 1312 may be independently controlled by the controller 12. Accordingly, the heating parts 1321 and 1322 which respectively correspond to the first coil part 1311 and the second coil part 1312 may be independently controlled (e.g., heating temperatures of the heating parts 1321 and 1322 may be independently controlled by independently controlling the intensity of power supplied to each of the first coil part 1311 and the second coil part 1312). Thus, control precision and control flexibility can be improved.

In some other embodiments, the first coil part 1311 and the second coil part 1312 may be controlled simultaneously by the controller 12. For example, the first coil part 1311 and the second coil part 1312 may be configured as a single coil and controlled together by the controller 12. In this case, a circuit configuration between the controller 12 and the coil parts 1311 and 1312 may be simplified.

Next, the heating element 132 may perform a function of heating the aerosol-generating article 2. That is, the heating element 132 may, when inductively heated by the inductor 131, heat the aerosol-generating article 2. Specifically, the heating element 132 may serve as a susceptor and include the plurality of heating parts 1321 and 1322. Here, the first heating part 1321 may heat the first segment 211 of the aerosol-generating article 2, and the second heating part 1322 may heat the second segment 212 of the aerosol-generating article 2. However, in some cases, a target to be heated by each of the heating parts 1321 and 1322 may not correspond to the segments 211 and 212 constituting the aerosol-generating article 2. In other words, regardless of the segment configuration of the aerosol-generating article 2, the first heating part 1321 may heat a first part of the aerosol-generating article 2, and the second heating part 1322 may heat a second part of the aerosol-generating article 2.

In some embodiments, as illustrated in FIG. 5, each of the heating parts 1321 and 1322 may be implemented as a physically distinct heating element. In other words, the first heating part 1321 may be implemented as a first heating element, and the second heating part 1322 may be implemented as a second heating element that is distinct from the first heating element.

In some other embodiments, the plurality of heating parts 1321 and 1322 may be implemented as a physically integrated heating element. In other words, the first heating part 1321 may constitute one portion of a specific heating element, and the second heating part 1322 may constitute the other portion of the specific heating element.

As illustrated, the heating parts 1321 and 1322 may be located at different distances D11 and D12 from the aerosol-generating article 2. Specifically, the first heating part 1321 may be located at a relatively short distance D11 from the first segment 211, and the second heating part 1322 may be located at a relatively long distance D12 from the second segment 212.

As illustrated in FIG. 5, the above-described difference between the distances D11 and D12 may be achieved by designing an inner diameter of the first heating part 1321 to be smaller than an inner diameter of the second heating part 1322. However, the scope of the present disclosure is not limited thereto. For example, when the first heating part 1321 and the second heating part 1322 are formed in a shape (e.g., a flat shape) other than a cylindrical shape, the above-described difference between the distances D11 and D12 may be achieved by placing each of the heating parts 1321 and 1322 at a suitable distance from the aerosol-generating article 2.

In such a case, due to the first heating part 1321 placed at the relatively shorter distance D11, the first segment 211 may be heated more (heated to a higher temperature) than the second segment 212. Also, in this case, vapor production may be increased due to a large amount of aerosol being formed in the first segment 211 containing an aerosol-forming agent, and a tobacco smoke taste may be provided persistently to a user due to an appropriate amount of nicotine being continuously transferred (expressed) from the second segment 212 containing a nicotine-generating substrate.

Meanwhile, the shapes, arrangement positions, materials, and heat capacities of the heating parts 1321 and 1322, distances from the heating parts 1321 and 1322 to the coil parts 1311 and 1312, lengths of the heating parts 1321 and 1322, and the like may be designed in various ways.

For example, as illustrated in FIG. 5, the heating parts 1321 and 1322 may be formed in a cylindrical shape. Alternatively, the heating parts 1321 and 1322 may be formed in a shape that corresponds to the aerosol-generating article 2. In this case, the entire aerosol-generating article 2 can be easily heated by the heating parts 1321 and 1322.

Also, for example, a downstream end of the second heating part 1322 located downstream may be disposed to align with a downstream end of the second segment 212. In other words, an end of the heating part (e.g., 1322) located most downstream may be disposed to align with a downstream end of the aerosol-forming substrate part 21. In this case, a change in the physical properties of the filter part 22 due to heat generation of the heating part (e.g., 1322) located most downstream may be prevented, and the entire aerosol-forming substrate part 21 may be easily heated.

Also, for example, the first heating part 1321 and the second heating part 1322 may be made of the same material. However, in another example, the first heating part 1321 and the second heating part 1322 may be made of different materials. For example, the first heating part 1321 may be made of a material that is inductively heated relatively more, and the second heating part 1322 may be made of a material that is inductively heated relatively less. In this case, heating of the segments 211 and 212 can be further differentiated, or differentiated heating can be implemented regardless of the difference between the distances D11 and D12.

Also, for example, a distance D21 from the first heating part 1321 to the first coil part 1311 may be the same as a distance D22 from the second heating part 1322 to the second coil part 1312. To this end, the first coil part 1311 may have a diameter smaller than a diameter of the second coil part 1312. However, in another example, the distance D21 may be different from the distance D22. For example, the distance D21 may be shorter than the distance D22. In this case, since the first heating part 1321 is inductively heated more strongly than the second heating part 1322, the first segment 211 may be heated more (heated to a higher temperature) than the second segment 212.

Also, for example, heat capacities of the two heating parts 1321 and 1322 may be the same. For example, the first heating part 1321 and the second heating part 1322 may be made of the same material (that is, the materials may have the same specific heat) and have the same mass. In this case, the temperatures of the two heating parts 1321 and 1322 may rise at the same speed. However, in another example, the heat capacities of the two heating parts 1321 and 1322 may be different.

In some embodiments, a heat capacity difference between the two heating parts 1321 and 1322 may be equal to or smaller than 20%, about 10%, or about 5% of the heat capacity of the first heating part 1321. Within such numerical ranges, the temperatures of the two heating parts 1321 and 1322 may rise at similar speeds.

Meanwhile, a heat capacity difference between the heating parts 1321 and 1322 having different inner diameters may be reduced in various ways.

Figure 7:
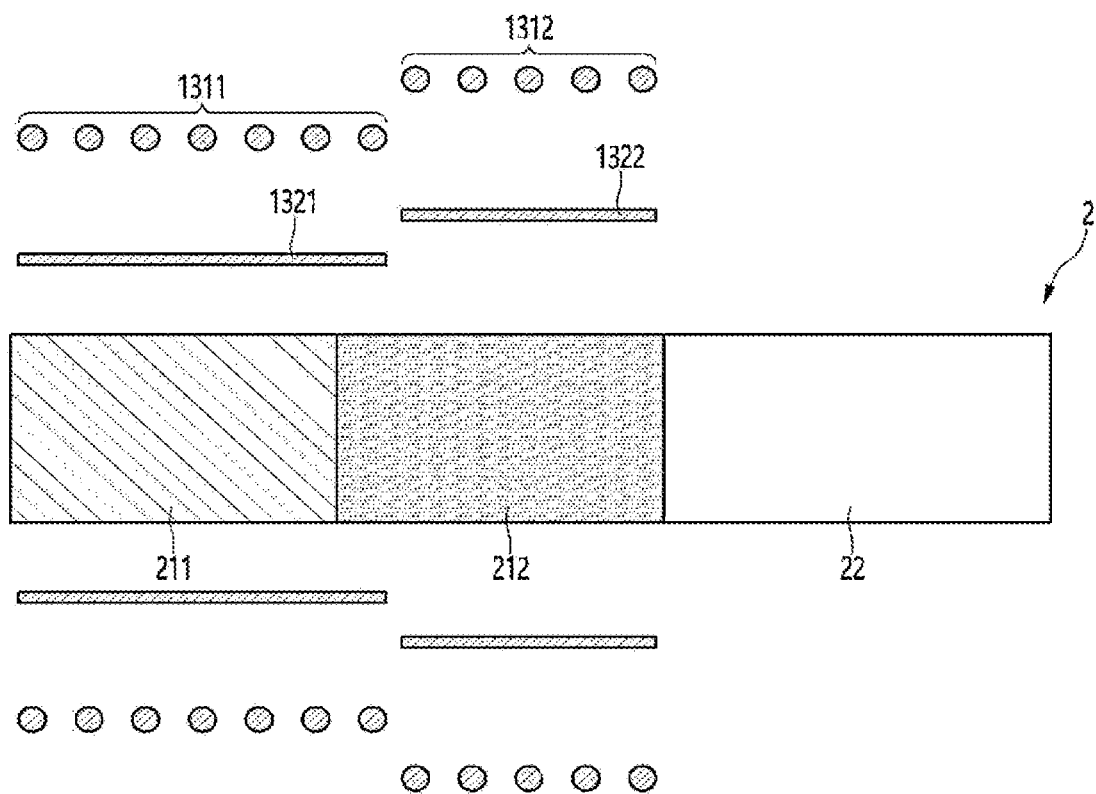
FIGS. 7 to 9 are exemplary views for describing a method of reducing a heat capacity difference between heating parts in the heater part according to the first embodiment of the present disclosure.

As an example, as illustrated in FIG. 7, by designing a length of the first heating part 1321 to be slightly longer than its original length (e.g., longer than a length of the first segment 211) and a length of the second heating part 1322 to be slightly shorter than its original length (e.g., shorter than a length of the second segment 212), a mass difference between the first heating part 1321 and the second heating part 1322 may be reduced. Also, as the mass difference is reduced, the heat capacity difference may be reduced.

Figure 8:
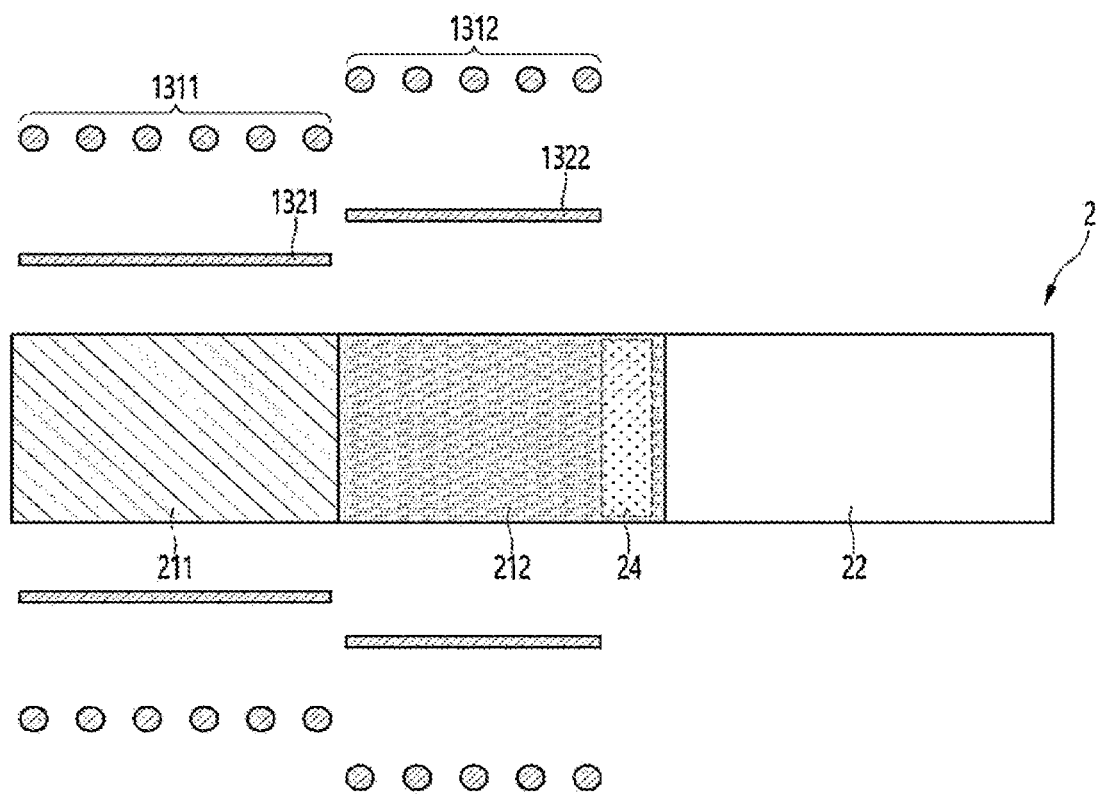

As another example, as illustrated in FIG. 8, by designing only the length of the second heating part 1322 to be shorter than its original length (e.g., shorter than the length of the second segment 212), a mass difference between the first heating part 1321 and the second heating part 1322 may be reduced. In this example, the second heating part 1322 may be disposed to heat portions of the second segment 212 excluding the downstream end portion thereof. In this case, a heating-limited region 24 may be formed in the downstream end portion of the second segment 212, and thus an aerosol filtering effect may also be generated. Here, "filtering" may not only refer to a case in which some components included in an aerosol are filtered, but also refer to a case in which other components are added into the aerosol. That is, "filtering" may encompass any case in which components in the aerosol change. Specifically, as an aerosol passes through the heating-limited region 24, some components in the aerosol may be filtered, or some components included in the heating-limited region 24 may be added into the aerosol. Therefore, components of the aerosol discharged to the outside of the aerosol-generating article 2 may be different from components of an initially-generated aerosol, and thus a different flavor may be expressed as compared to when the entire second segment 212 is heated.

Figure 9:
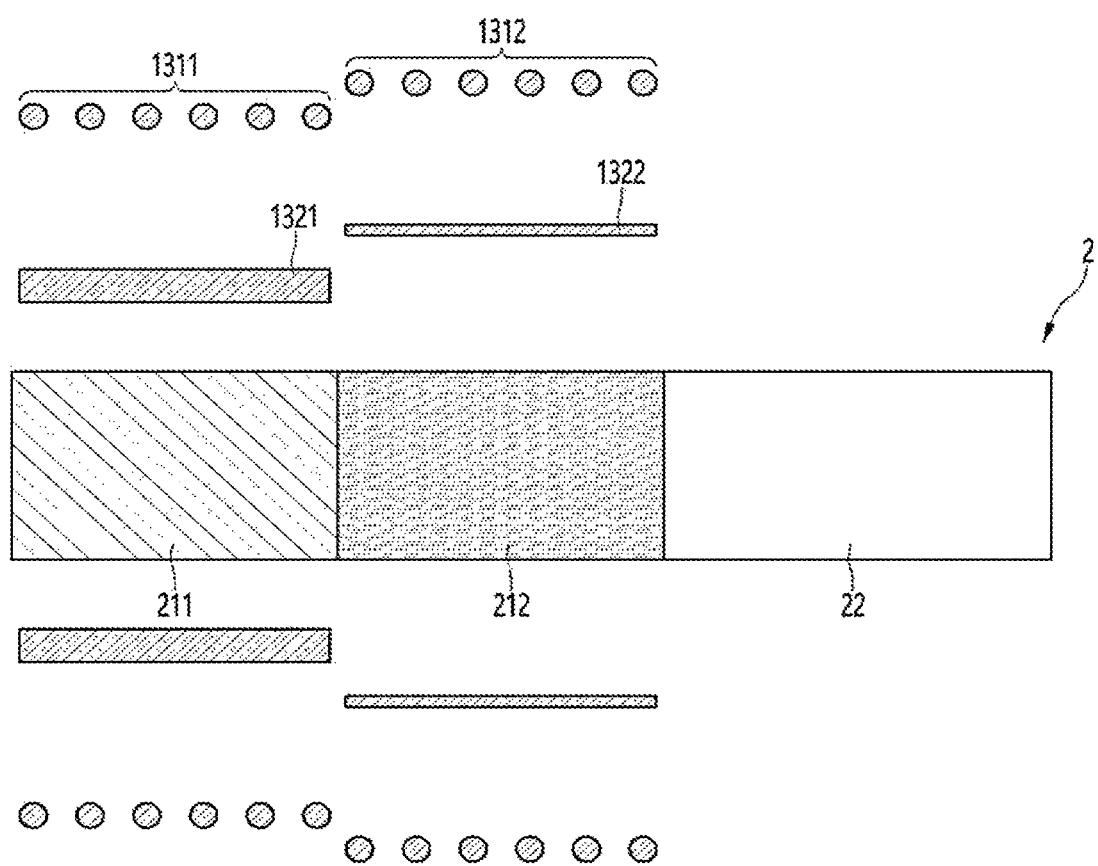

As still another example, as illustrated in FIG. 9, by designing a thickness of the first heating part 1321 to be greater than a thickness of the second heating part 1322, a mass difference between the first heating part 1321 and the second heating part 1322 may be reduced. Also, as the mass difference is reduced, the heat capacity difference may be reduced.

The heater part 13 according to the first embodiment of the present disclosure has been described above with reference to FIGS. 5 to 9. Hereinafter, a differentiated heating structure and a principle of the heater part 13 according to a second embodiment of the present disclosure will be described with reference to FIG. 10. For clarity of the present disclosure, description of content overlapping with the previous embodiment will be omitted.

Figure 10:
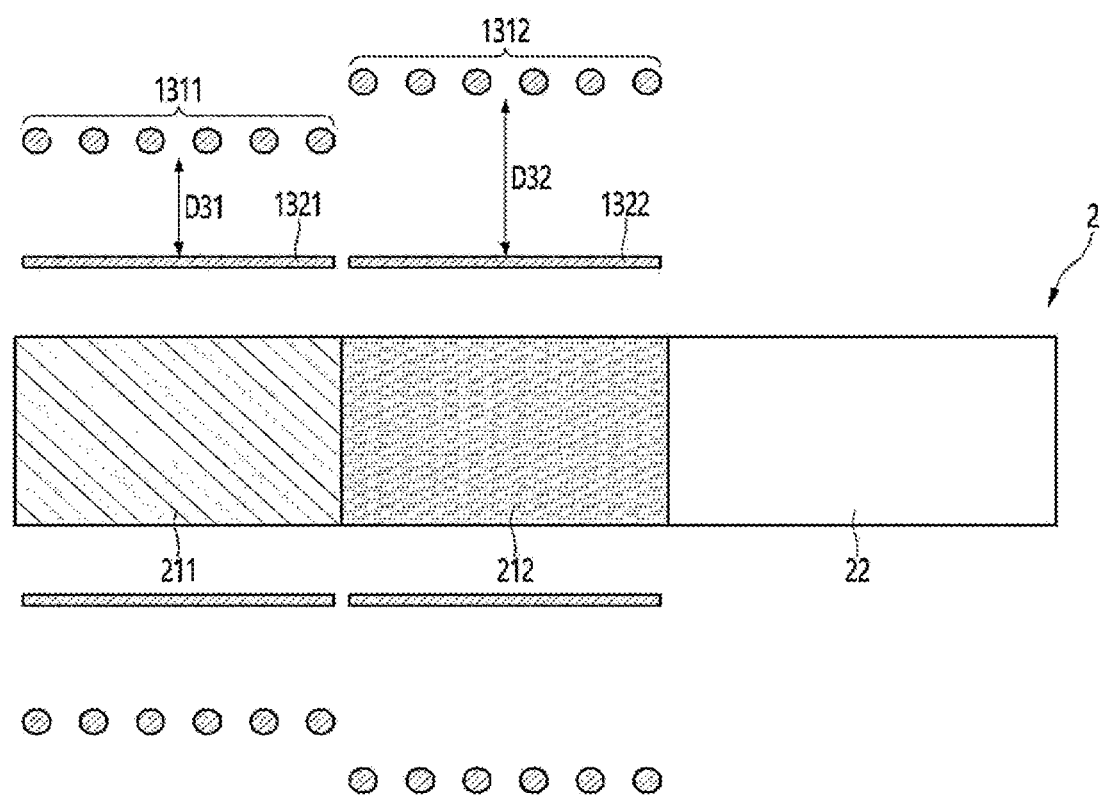
FIGS. 10 and 11 are an exemplary views for describing a differentiated heating structure and a principle of a heater part according to a second embodiment of the present disclosure.

As illustrated in FIG. 10, the present embodiment relates to the heater part 13 that performs differentiated heating on the basis of a distance between a coil part (e.g., 1311) and a heating part (e.g., 1321).

Specifically, the heater part 13 according to the present embodiment may include the plurality of heating parts 1321 and 1322 and the coil parts 1311 and 1312 located at different distances from the heating parts 1321 and 1322. For example, the heater part 13 may include the first coil part 1311 located at a relatively short distance D31 from the first heating part 1321 and the second coil part 1312 located at a relatively long distance D32 from the second heating part 1322. As a more specific example, the heater part 13 may include the plurality of heating parts 1321 and 1322 whose inner diameters are the same or similar, the first coil part 1311 whose diameter is relatively small, and the second coil part 1312 whose diameter is relatively large.

In such a case, since the first heating part 1321 located at the relatively short distance D31 from the first coil part 1311 is inductively heated more strongly than the second heating part 1322, the first segment 211 may be heated more (heated to a higher temperature) than the second segment 212.

The heater part 13 according to the second embodiment of the present disclosure has been described above with reference to FIG. 10. Hereinafter, a differentiated heating structure and a principle of the heater part 13 according to a third embodiment of the present disclosure will be described with reference to FIG. 11.

Figure 11:
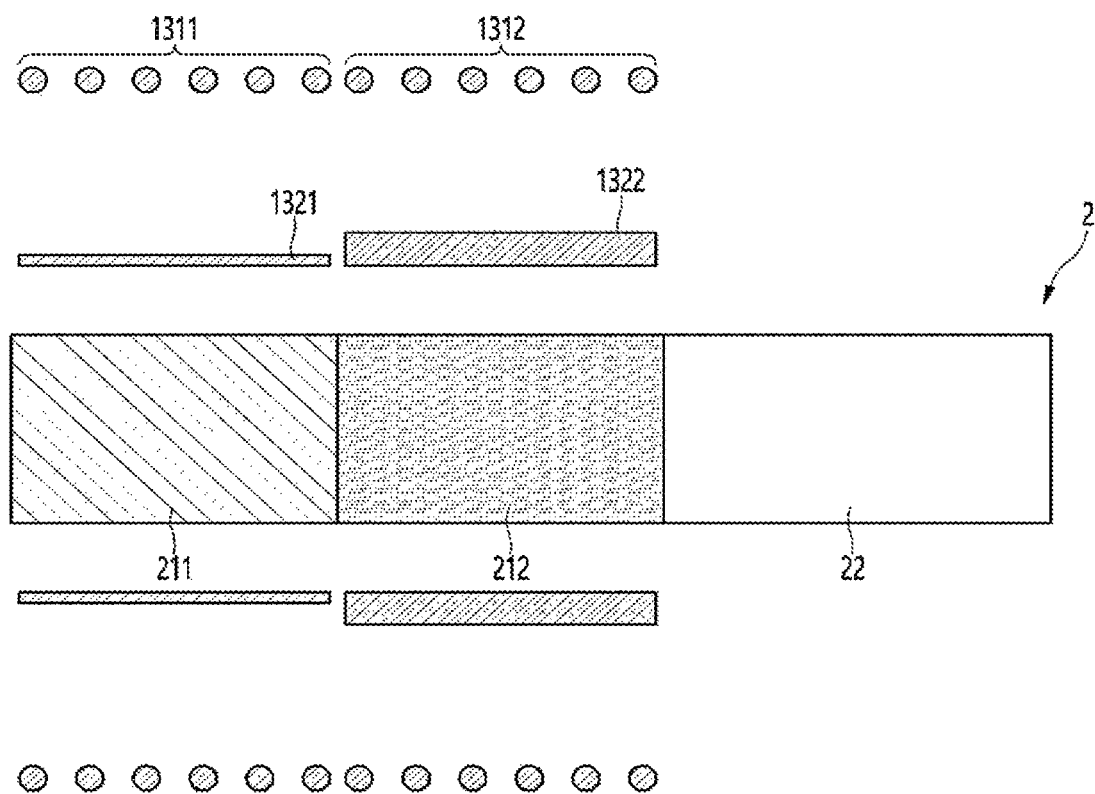

As illustrated in FIG. 11, the present embodiment relates to the heater part 13 that performs differentiated heating on the basis of a heat capacity difference between the heating parts 1321 and 1322.

Specifically, the heater part 13 according to the present embodiment may include the plurality of heating parts 1321 and 1322 whose heat capacities are different and the coil parts 1311 and 1312 for inductively heating the heating parts 1321 and 1322. For example, the heater part 13 may include the first heating part 1321 whose mass is relatively small and the second heating part 1322 whose mass is relatively large. Here, the materials of the first heating part 1321 and the second heating part 1322 may have the same specific heat or similar specific heats, but the present embodiment is not limited thereto.

In such a case, due to the heating parts 1321 and 1322 being inductively heated by the coil parts 1311 and 1312, the temperature of the first heating part 1321 may rise at a higher speed than the temperature of the second heating part 1322, and as a result, the first segment 211 may be heated to a higher temperature than the second segment 212.

The heater part 13 according to the third embodiment of the present disclosure has been described above with reference to FIG. 11. Hereinafter, a differentiated heating structure and a principle of the heater part 13 according to a fourth embodiment of the present disclosure will be described with reference to FIG. 12.

Figure 12:
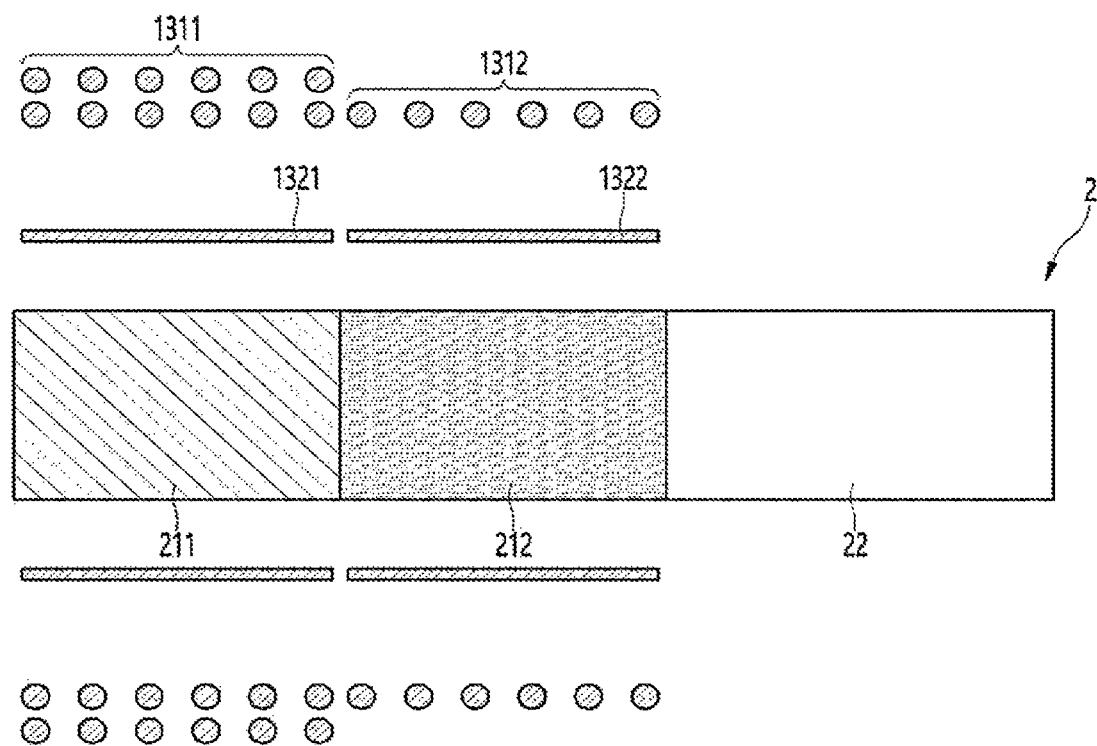
FIG. 12 is an exemplary view for describing a differentiated heating structure and a principle of a heater part according to a third embodiment of the present disclosure.

As illustrated in FIG. 12, the present embodiment relates to the heater part 13 that performs differentiated heating on the basis of the number of turns of a coil part (e.g., 1311).

Specifically, the heater part 13 according to the present embodiment may include the first coil part 1311 whose number of turns is relatively large, the second coil part 1312 whose number of turns is relatively small, and the heating parts 1321 and 1322 inductively heated by the coil parts 1311 and 1312. Here, in order to more efficiently utilize a winding space, the coil parts 1311 and 1312 may have a plurality of winding layers. For example, as illustrated, the first coil part 1311 may have a plurality of winding layers. Alternatively, both of the two coil parts 1311 and 1312 may have a plurality of winding layers, and the number of winding layers of the first coil part 1311 may be larger than the number of winding layers of the second coil part 1312.

In such a case, since the first heating part 1321 is inductively heated more strongly than the second heating part 1322 due to the first coil part 1311 having a greater number of turns, the first segment 211 may be heated more (heated to a higher temperature) than the second segment 212.

The heater part 13 according to the fourth embodiment of the present disclosure has been described above with reference to FIG. 12. Hereinafter, the heater part 13 according to a fifth embodiment of the present disclosure will be described with reference to FIG. 13 and so on.

Figure 13:
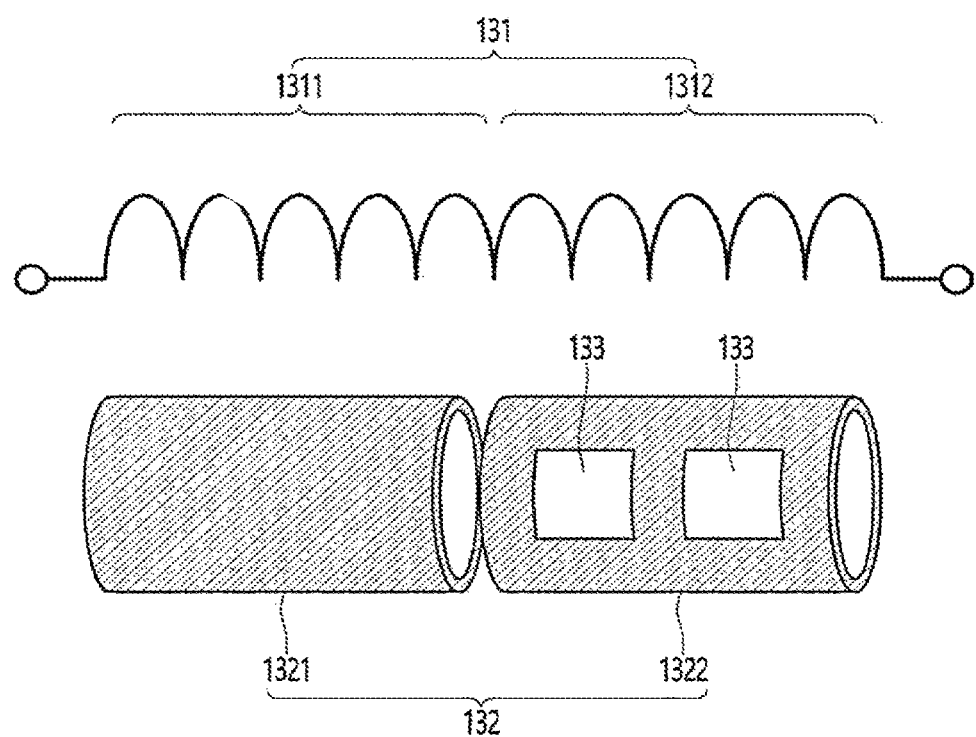
FIGS. 13 and 14 are exemplary views for describing a differentiated heating structure and a principle of a heater part according to a fourth embodiment of the present disclosure.
Figure 14:
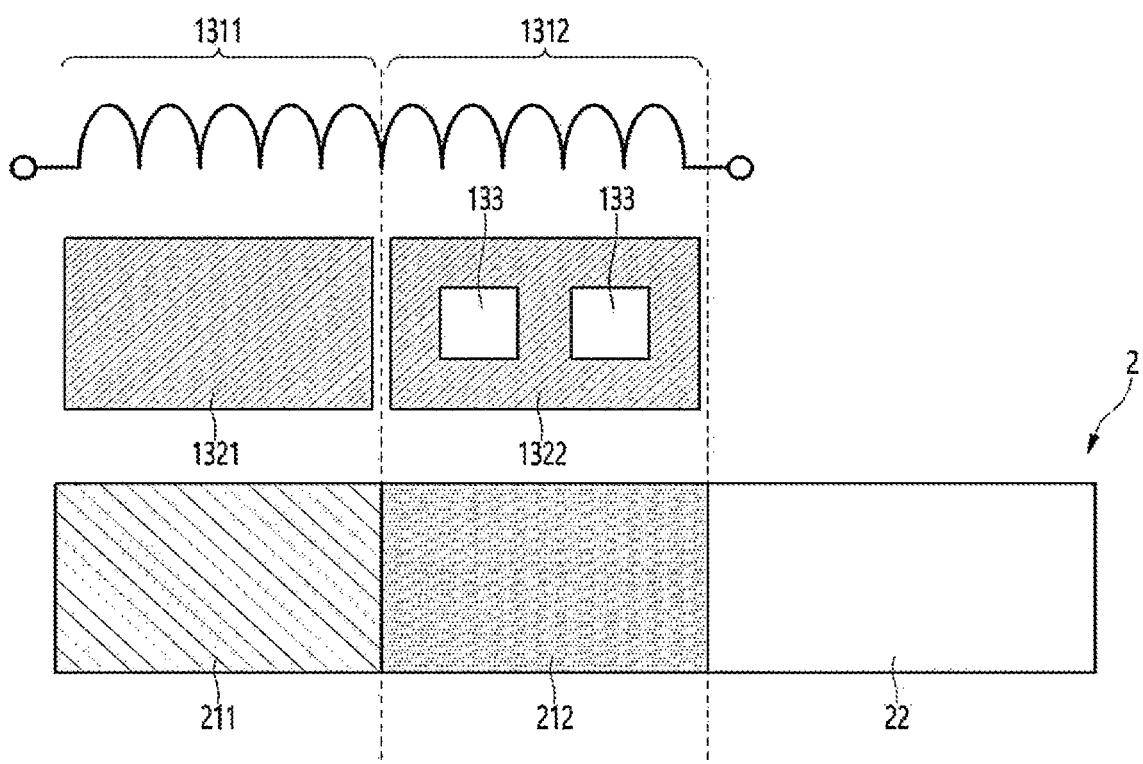

FIGS. 13 and 14 are exemplary views for describing a differentiated heating structure and a principle of the heater part 13 according to the fifth embodiment of the present disclosure. In particular, in order to provide convenience of understanding, the heating parts 1321 and 1322 are illustrated in plan views in FIG. 14 and so on.

As illustrated in FIGS. 13 and 14, the present embodiment relates to the heater part 13 that performs differentiated heating using openings 133 formed in the heating parts 1321 and 1322.

Specifically, the heater part 13 according to the present embodiment may include the coil parts 1311 and 1312 and the plurality of heating parts 1321 and 1322 inductively heated by the coil parts 1311 and 1312, respectively. Also, one or more openings 133 may be formed in the second heating part 1322 (in a case where the second segment 212 is to be heated less). Alternatively, an area occupied by the openings 133 may be larger in the second heating part 1322 than in the first heating part 1321. For example, the number of openings 133 formed in the second heating part 1322 may be greater than the number of openings 133 formed in the first heating part 1321, or the size of the openings 133 formed in the second heating part 1322 may be larger than the size of the openings 133 formed in the first heating part 1321.

In such a case, since a heating area of the second heating part 1322 is smaller than a heating area of the first heating part 1321, the second segment 212 may be heated relatively less (heated to a lower temperature), and the first segment 211 may be heated relatively more (heated to a higher temperature).

The number, shape, size, positions, arrangement form, and the like of the openings 133 may be designed in various ways.

For example, the openings 133 may have a triangular shape, a quadrangular shape (slot shape), a circular shape, or the like, but the shape of the openings 133 is not limited thereto.

Figure 15:
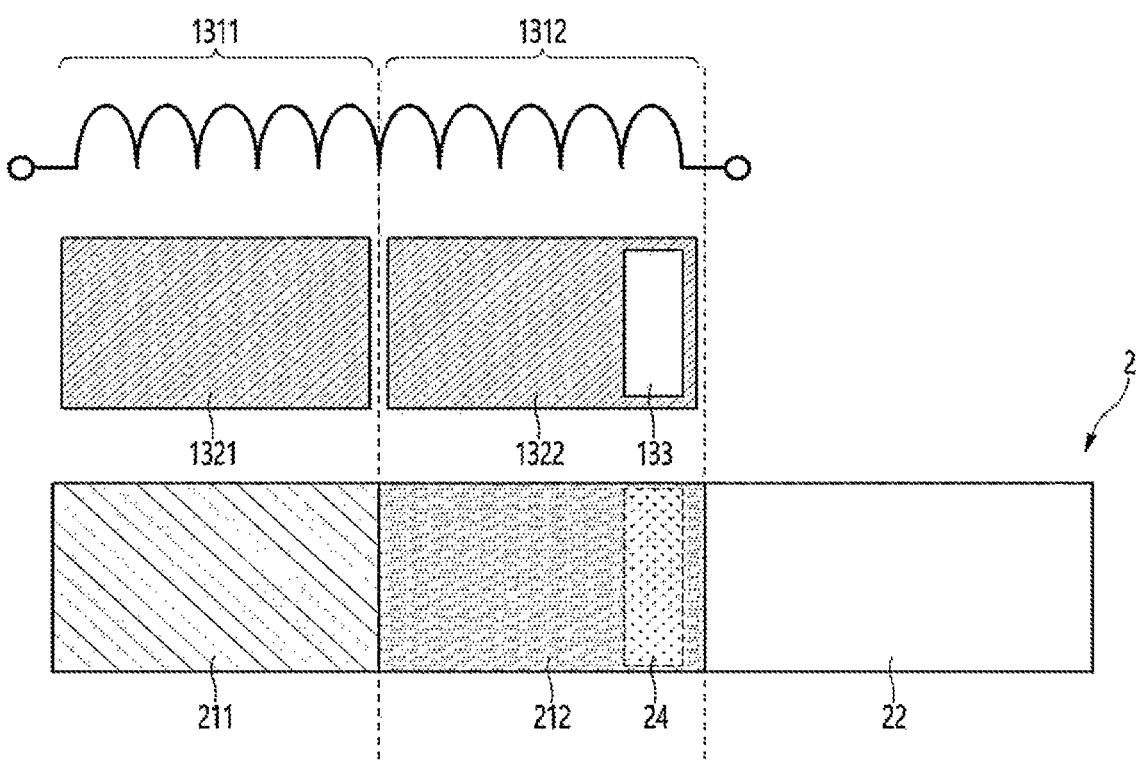
FIG. 15 is an exemplary view for describing a position of an opening in the heater part according to the fourth embodiment of the present disclosure.

Also, for example, the opening 133 may be formed at a position that corresponds to a downstream end portion of the second segment 212. As a more specific example, as illustrated in FIG. 15, the opening 133 may be formed in the second heating part 1322 so that the heating-limited region 24 (that is, a region heated relatively less) is formed in a horizontal direction in the downstream end portion of the second segment 212. In this case, an aerosol filtering effect may be generated, and a unique smoking experience can be provided to a user.

Also, for example, one or more openings 133 may be formed in the horizontal direction (that is, the direction perpendicular to the longitudinal direction). As a more specific example, a plurality of openings 133 may be formed in the horizontal direction in the second heating part 1322 and may be formed to be spaced apart from each other. Here, separation distances between the openings 133 may be the same or different from each other. For example, the plurality of openings 133 may be formed so that the separation distances progressively increase or decrease. Also, the sizes of the openings 133 may be the same or different from each other. For example, the plurality of openings 133 may be formed so that the sizes progressively increase or decrease.

Figure 16:
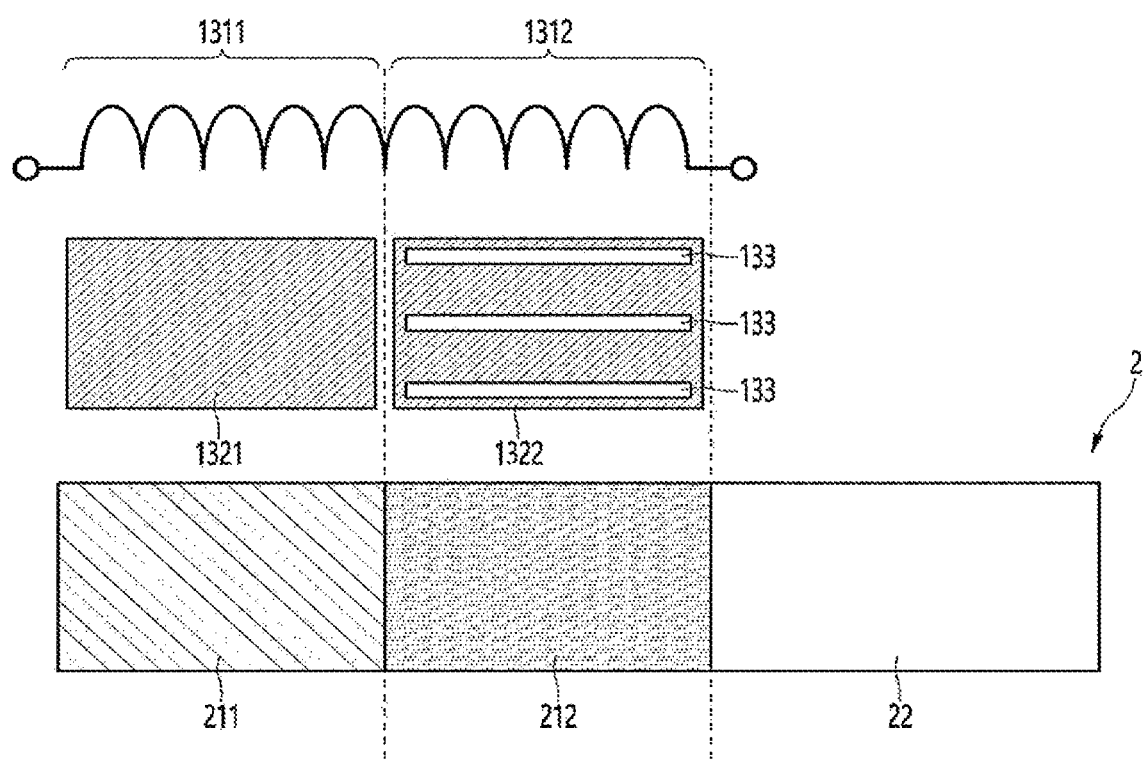
FIG. 16 is an exemplary view for describing an arrangement form of openings in the heater part according to the fourth embodiment of the present disclosure.

Also, for example, one or more openings 133 may be formed in the longitudinal (vertical) direction. As a more specific example, as illustrated in FIG. 16, the plurality of openings 133 may be formed in the longitudinal direction in the second heating part 1322 and may be formed to be spaced apart from each other. In this case, a problem that the aerosol-generating article 2 is damaged due to the openings 133 can be significantly mitigated. For example, the aerosol-generating article 2 may be stuck or caught in the openings 133 when being inserted or removed, but this problem may be significantly mitigated by forming the openings 133 in a direction identical to the direction in which the aerosol-generating article 2 is inserted (or removed).

Meanwhile, the shapes, arrangement positions, materials, and heat capacities of the heating parts 1321 and 1322, distances from the heating parts 1321 and 1322 to the coil parts 1311 and 1312, lengths of the heating parts 1321 and 1322, and the like may be designed in various ways.

For example, a distance from the first heating part 1321 to the first coil part 1311 (hereinafter referred to as "first distance") may be the same as a distance from the second heating part 1322 to the second coil part 1312 ("second distance"). For example, when outer diameters of the two heating parts 1321 and 1322 are the same, diameters of the two coil parts 1311 and 1312 may also be the same. However, in another example, the first distance and the second distance may be different from each other. For example, the first distance may be shorter than the second distance. In this case, since the first heating part 1321 is inductively heated more strongly than the second heating part 1322, the first segment 211 may be heated more (heated to a higher temperature) than the second segment 212.

Also, for example, heat capacities of the two heating parts 1321 and 1322 may be the same. For example, the first heating part 1321 and the second heating part 1322 may be made of the same material (that is, the materials may have the same specific heat) and have the same mass. In this case, the temperatures of the two heating parts 1321 and 1322 may rise at the same speed. However, in another example, the heat capacities of the two heating parts 1321 and 1322 may be different.

Figure 17:
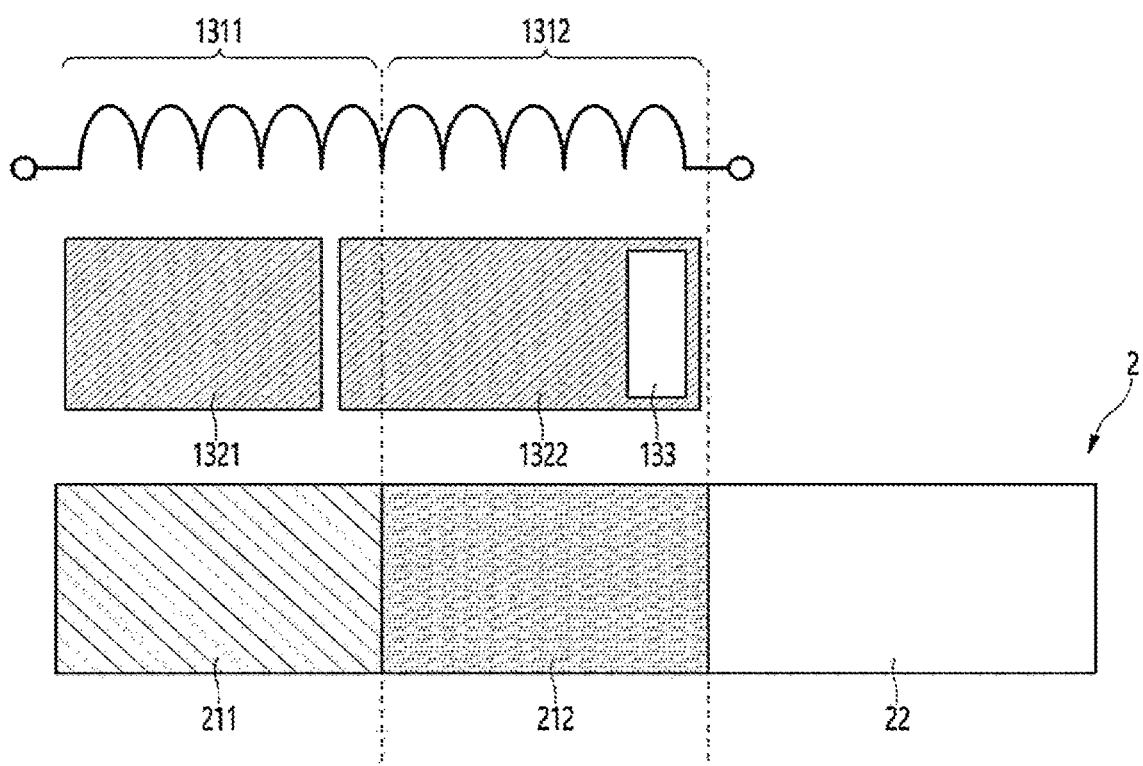
FIG. 17 is an exemplary view for describing a method of reducing a heat capacity difference between heating parts in the heater part according to the fourth embodiment of the present disclosure.

In some embodiments, in order to reduce a heat capacity difference between the two heating parts 1321 and 1322, the sizes of the two heating parts 1321 and 1322 may be designed to be different. For example, when the materials of the two heating parts 1321 and 1322 have the same specific heat or similar specific heats, in order to prevent a heat capacity (mass) difference between the two heating parts 1321 and 1322 from increasing due to the openings 133, the second heating part 1322 may be designed to be larger than the first heating part 1321. As a more specific example, as illustrated in FIG. 17, a length of the second heating part 1322 may be designed to be longer than a length of the first heating part 1321. Alternatively, a thickness of the second heating part 1322 may be designed to be greater than a thickness of the first heating part 1321. In this case, the mass difference due to the openings 133 may be reduced and the heat capacity difference may be reduced, and thus the temperatures of the first heating part 1321 and the second heating part 1322 may rise at the same or similar speed.

The heater part 13 according to the fifth embodiment of the present disclosure has been described above with reference to FIGS. 13 to 17.

Various embodiments of the heater part 13 having a differentiated heating function have been described above with reference to FIGS. 5 to 17. Each embodiment has been separately described, but this is only to provide convenience of understanding, and the above-described embodiments may be combined in various forms. For example, the heater part 13 may be configured to include the first heating part 1321, the second heating part 1322 in which one or more openings 133 are formed and whose inner diameter is larger than an inner diameter of the first heating part 1321, and the coil parts 1311 and 1312 for inductively heating the heating parts 1321 and 1322, respectively (combination of the first embodiment and the fifth embodiment).

Also, the above description has been made on the assumption that the heater part 13 operates using the induction heating method. However, the heater part 13 according to some other embodiments of the present disclosure may operate using the resistive heating method. In this case, the heater part 13 may only include an electrically resistive heating element 132 without including the inductor 131, and the heating element 132 may be configured to include a plurality of heating parts (e.g., 1321, 1322) configured to heat different parts (e.g., the segments 211 and 212) of the aerosol-generating article 2. Also, for example, the plurality of heating parts (e.g., 1321, 1322) may heat different parts of the aerosol-generating article 2 in a differentiated manner on the basis of a distance from the aerosol-generating article 2, the opening 133, or the like.

All the components constituting the embodiments of the present disclosure have been described above as being combined into one body or being operated in combination, but the technical spirit of the present disclosure is not necessarily limited to the embodiments. That is, any one or more of the components may be selectively operated in combination within the intended scope of the present disclosure.

The embodiments of the present disclosure have been described above with reference to the accompanying drawings, but those of ordinary skill in the art to which the present disclosure pertains should understand that the present disclosure may be embodied in other specific forms without changing the technical spirit or essential features thereof. Therefore, the embodiments described above should be understood as being illustrative, instead of limiting, in all aspects. The scope of the present disclosure should be interpreted according to the claims below, and any technical spirit within the scope equivalent to the claims should be interpreted as falling within the scope of the technical spirit defined by the present disclosure.

What is claimed is:

1. An aerosol generation device comprising:
   a housing configured to form an accommodation space for accommodating an aerosol-generating article; and
   a heater part surrounding the aerosol-generating article and configured to heat the aerosol-generating article accommodated in the accommodation space to generate an aerosol,
   wherein the heater part includes:
      a first susceptor configured to heat a first part of the aerosol-generating article from a first distance away from a surface of the aerosol-generating article, and
      a second susceptor configured to heat a second part of the aerosol-generating article from a second distance away from the surface of the aerosol-generating article, the second distance being longer than the first distance.

2. The aerosol generation device of claim 1, wherein the heater part further includes an inductor configured to inductively heat the first susceptor and the second susceptor.

3. The aerosol generation device of claim 2, wherein:
   the inductor includes a first coil part that corresponds to the first susceptor and a second coil part that corresponds to the second susceptor; and
   a number of winding layers of the first coil part is more than the a number of winding layers of the second coil part.

4. The aerosol generation device of claim 1, wherein:
   the first part is a first segment of the aerosol-generating article;
   the second part is a second segment located downstream of the first segment;
   the first segment includes an aerosol-forming agent; and
   the second segment includes a nicotine-generating substrate.

5. The aerosol generation device of claim 4, wherein the second susceptor is configured to heat portions of the second segment excluding a downstream end portion thereof.

6. The aerosol generation device of claim 1, wherein an inner diameter of the first susceptor is less than an inner diameter of the second susceptor.

7. The aerosol generation device of claim 6, wherein:
   the heater part further includes an inductor;
   the inductor includes a first coil part for inductively heating the first susceptor and a second coil part for inductively heating the second susceptor; and
   a diameter of the first coil part is smaller than a diameter of the second coil part.

8. The aerosol generation device of claim 6, wherein a length of the first susceptor is longer than a length of the second susceptor.

9. The aerosol generation device of claim 6, wherein a thickness of the first susceptor is thicker than a thickness of the second susceptor.

10. The aerosol generation device of claim 1, wherein a heat capacity difference between the first susceptor and the second susceptor is 10% or less of a heat capacity of the first susceptor.

11. The aerosol generation device of claim 1, wherein at least one opening is formed in the second susceptor.

* * * * *